UNITED STATES PATENT OFFICE.

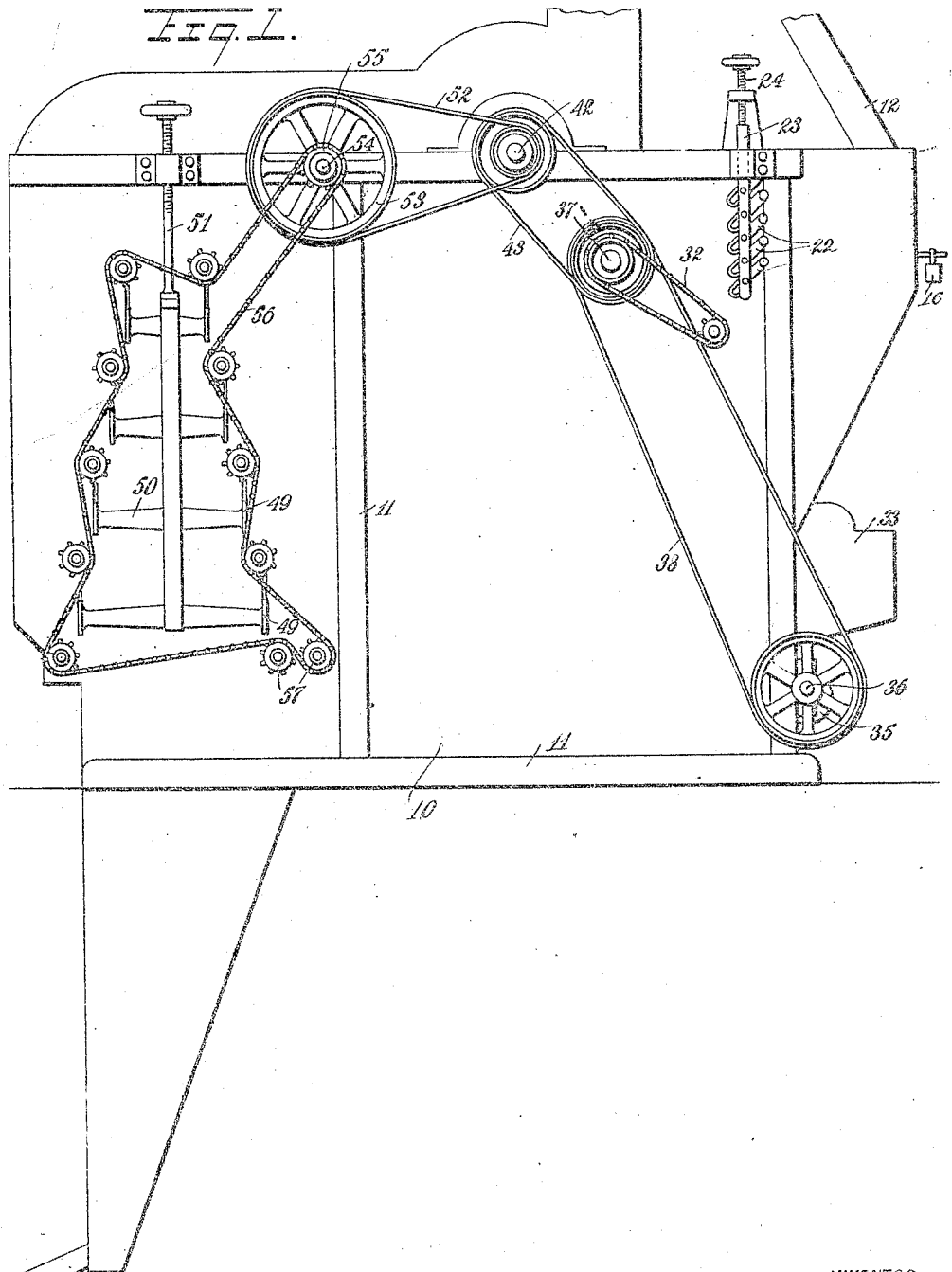

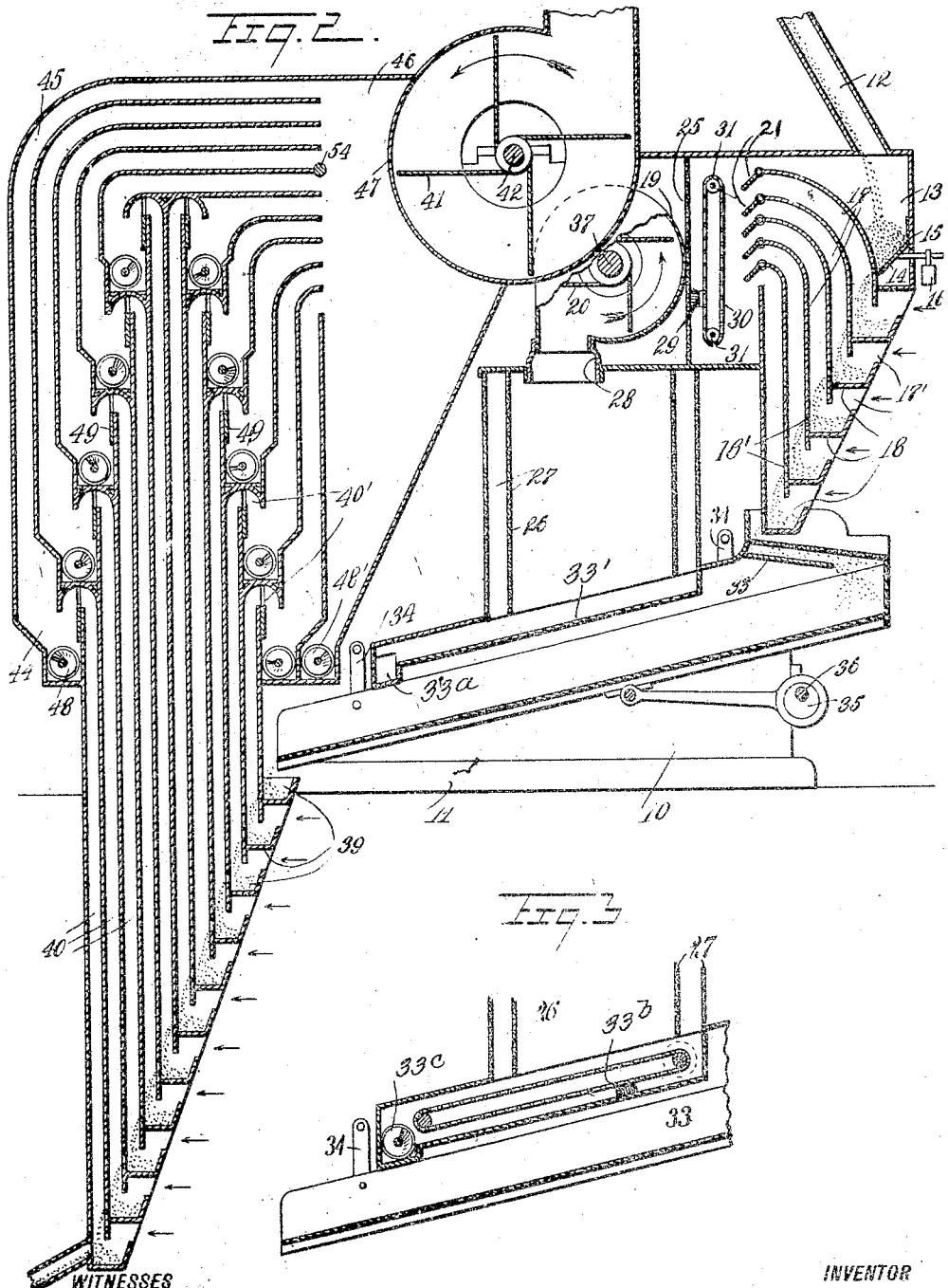

JOHN JACKSON RAMSAUR, OF LINCOLNTON, NORTH CAROLINA.

WHEAT-CLEANER.

1,063,139.  Specification of Letters Patent.  Patented May 27, 1913.

Application filed October 21, 1912. Serial No. 726,965.

*To all whom it may concern:*

Be it known that I, JOHN J. RAMSAUR, a citizen of the United States, and a resident of Lincolnton, in the county of Lincoln and State of North Carolina, have invented a new and Improved Wheat-Cleaner, of which the following is a full, clear, and exact description.

This invention relates to machinery for winnowing or cleaning grain in mills or elevators, and has particular reference to a machine of the type indicated for the thorough cleaning of wheat preparatory to the manufacture of the highest grades of flour in a flour mill.

It is to be understood that the machine is well adapted for the purification of other grains than wheat, and may be used with slight modification by any person wishing to clean grain with respect to dust, chaff, screenings or the like.

The invention comprises a mechanism including independent fans for operating upon the grain while it is passing through the machine at different places, the arrangement being such that the impurities are withdrawn from the grain at a great many different points, whereby the purification is carried on to a very perfect degree without in any manner carrying over or wasting any of the good grain.

A further object of the invention is to construct a machine so as to readily control the various operations, whereby the different functions are regulated according to the various requirements, and whereby the output of a machine with respect to the amount of power required is very much enlarged over other machines previously proposed.

The foregoing and other objects of the invention are attained by the mechanism hereinafter fully described and claimed, and illustrated in the accompanying drawings, whereon similar parts are referred to by reference characters, and of which—

Figure 1 is a side elevation of a machine made in accordance with this invention; Fig. 2 is a vertical section of the same; and Fig. 3 is a detail of a modification of the means for discharging the dust from the dust receptacle, the same including an endless scraper and a screw conveyer.

Referring particularly to the drawings, I provide a casing 10 having any suitable form of framework 11 adapted to support the same upon a floor or other support. The framework will constitute the means for supporting the operating parts of the machine, together with the adjusting devices described below.

The numeral 12 represents a spout leading from any suitable source of supply for the grain to be cleaned, the grain flowing therethrough into a hopper 13 having a valve 14 hinged at 15 and held more or less closed by means of an adjustable weight 16. By this means the position of the valve 14 may be regulated to control the speed of the flow of grain from the hopper 13.

Below the hopper 13 and valve 14 are arranged a succession of chutes 17, shown herein as five in number, into and through which as many blasts of air are admitted through the openings 17' in the front of the casing. The grain passing from the valve 14 falls across said chutes in succession, and over a series of shelves or ledges 18, the grain rolling from the shelf 18 at the bottom of each chute, through an opening 18', upon the shelf 18 of the next chute, until it reaches a shoe, described below. The chutes 17 lead upwardly and thence laterally toward a fan casing 19, in which is journaled a fan 20. The upper ends of the chutes are guarded by a series of adjustable valves 21, whereby the intensity of the blasts may be regulated in any suitable manner, as, for instance, by providing each of the valves with a slotted arm 22 to which is connected a bar 23, and adjustable by means of a hand screw 24 or the like on the outside of the casing.

The blast caused by the fan 20 leads from the chutes 17 through a screen 25 made of wire netting, or the like, which serves the purpose of obstructing the passage to the fan of straw, strings, or other large light particles; the dust, however, and smaller particles passing through said screen and into the fan casing as through one or both ends thereof, and thence driven downwardly into a receptacle 26 having double walls 27 made of fabric which will permit the air to be dissipated but retain the dust and other light particles within the same. Said receptacle is connected with the fan casing 19 by means of a cloth or other flexible connection 28, which will permit the receptacle to be oscillated or agitated without disturbing the fan casing, which is preferably stationary within the casing 10. The screen 25 is kept substantially clean for the passage of dust and lighter particles by means of a brush 29 carried by an endless chain or belt 30 operating over rollers 31 and driven by means of an external sprocket chain or belt 32. After the wheat or other grain leaves the lowermost shelf 18 it falls upon the aforesaid shoe 33, which may be suspended in any suitable manner, as by links 34, within the main casing and oscillated by means of one or more eccentrics 35 connected to a shaft 36, which may be the power shaft for the machine, although it is to be understood that power may be applied to any other shaft indicated, if desired. As shown in Fig. 1, the shaft 36 is connected to the shaft 37 of the fan 20 by means of pulleys and a belt or chain 38, so that either of said shafts may be driven from the other. By means of the oscillation of the shoe 33 the wheat is transferred from the lower front portion of the machine across to the rear portion thereof, whence the wheat will fall over a succession of shelves 39, passing from each shelf to the next across the mouths of screenings chutes 40, shown in this instance as ten in number. The dust received from the fan 20 into the receptacle 26 and retained therein or prevented from escaping laterally is conveyed along the plate 33' of the oscillating shoe 33 and is adapted to be conducted laterally from the lower end of the same by any suitable means as through a laterally extending trough 33ª. It will be noted, therefore, that the lower end of the receptacle being connected to the shoe will cause ordinarily the free delivery of the dust from the bottom of the receptacle. In Fig. 3, however, the dust is conveyed positively along the chute by means of a brush 33ᵇ and thence laterally from the lower end of the shoe by a conveyer 33ᶜ. Each of these chutes is of comparatively small cross sectional area whereby a very intense suction is caused by means of larger and more powerful suction fan or fans 41 mounted upon a shaft 42 having connection with the shaft 37 through a belt 43. The purpose of the chutes 40 is to finally cleanse the wheat of any screenings or heavier particles which may pass the first series of winnowing chutes. The chutes 40 lead upwardly, and each terminates at its upper end in a curved outlet 40' and delivers the screenings into an enlargement or boot 44. The boot 44 being of much larger area than the chutes 40 leading thereto, or the air passage 45 leading therefrom to the chamber 46 adjacent the fan casing 47, will permit the intense current of air leading through the chutes 40 to become, in a large measure, dissipated, whereby the screenings will fall into the bottom of the boot whence they will be carried laterally out of the machine by means of a screw conveyer or the like 48. All of the outlets of said screenings chutes are controlled by adjustable valves 49 which may be operated from the outside by any suitable means. As illustration of such means I show said valves connected by a series of bars 50 to an adjustment screw 51. The fan shaft 42 is connected by means of a belt 52 with a large pulley 53 mounted upon a shaft 54 having a sprocket wheel 55 over which operates an endless sprocket chain 56 to drive the aforesaid screw conveyers 48. The chamber 46 leads at its lower end to an auxiliary conveyer 48' for the disposition of any heavier particles, such as screenings, weed seeds or the like, that may be carried thereinto, but which will drop after reaching the chamber because of its comparatively large area. Each of said conveyers is mounted on a shaft having an external sprocket wheel 57 over which the aforesaid chain operates.

The several parts of this machine may be made from suitable materials, and the relative size and proportion of the same may be varied as the various conditions may dictate without departing from the spirit of the invention.

Having thus described my invention, what I claim as new and desire to secure by Letters Patent is:—

In a machine of the class specified, the combination of air current mechanism, means to deliver grain so as to be operated upon by said mechanism to withdraw the dust and other lighter particles therefrom, means in communication with said mechanism to receive and retain the dust, a series of narrow air current chutes, a high-tensioned suction fan operative through said chutes, means including an oscillatory shoe to deliver the dust-cleaned grain along the lower ends of said chutes in succession whereby the screenings are removed therefrom and conveyed upwardly, the lower part of the dust retaining means being connected to said shoe, and means to deliver said screenings from the upper ends of said chutes.

In testimony whereof I have signed my name to this specification in the presence of two subscribing witnesses.

JOHN JACKSON RAMSAUR.

Witnesses:
R. E. COSTNER,
JULIUS A. SUTTLE.